May 26, 1931.   W. C. HERMAN   1,807,035
REVERSIBLE VARIABLE SPEED TRANSMISSION MECHANISM
Filed April 12, 1930   3 Sheets-Sheet 1

INVENTOR,
Wallace C. Herman,
BY Howard D. Smith,
His ATTORNEY

May 26, 1931.  W. C. HERMAN  1,807,035
REVERSIBLE VARIABLE SPEED TRANSMISSION MECHANISM
Filed April 12, 1930  3 Sheets-Sheet 2

INVENTOR,
Wallace C. Herman,
BY Howard S. Smith,
His ATTORNEY

Patented May 26, 1931

1,807,035

UNITED STATES PATENT OFFICE

WALLACE C. HERMAN, OF OAKWOOD, OHIO

REVERSIBLE VARIABLE SPEED TRANSMISSION MECHANISM

Application filed April 12, 1930. Serial No. 443,707.

This invention relates to new and useful improvements in reversible variable speed transmission mechanism.

It is one of the principal objects of my invention to provide simple and efficient variable speed means for obtaining any desired speed ratio between a driving shaft and the driven shaft.

Another object of the invention is to provide adjusting mechanism whereby the action of the eccentric cams will either oppose each other to defeat any movement of the driven shaft, or be brought into such relation as to effect any movement of that shaft between zero and maximum.

It is still another object of my invention to provide means for bringing the driven shaft to a standstill without the use of a clutch or other mechanism for disengaging the driving shaft.

It is another object of my invention to accelerate the speed of the driven shaft, with smoothness and uniformity, irrespective of the load applied to it.

Another object of the invention is to provide a simple mechanism for reversing the direction of rotation of the driven shaft without the usual gear or belt shifting means heretofore employed in variable speed transmissions.

Other important and incidental objects will be brought out in the following specification and particularly set forth in the subjoined claims.

Figure 1:
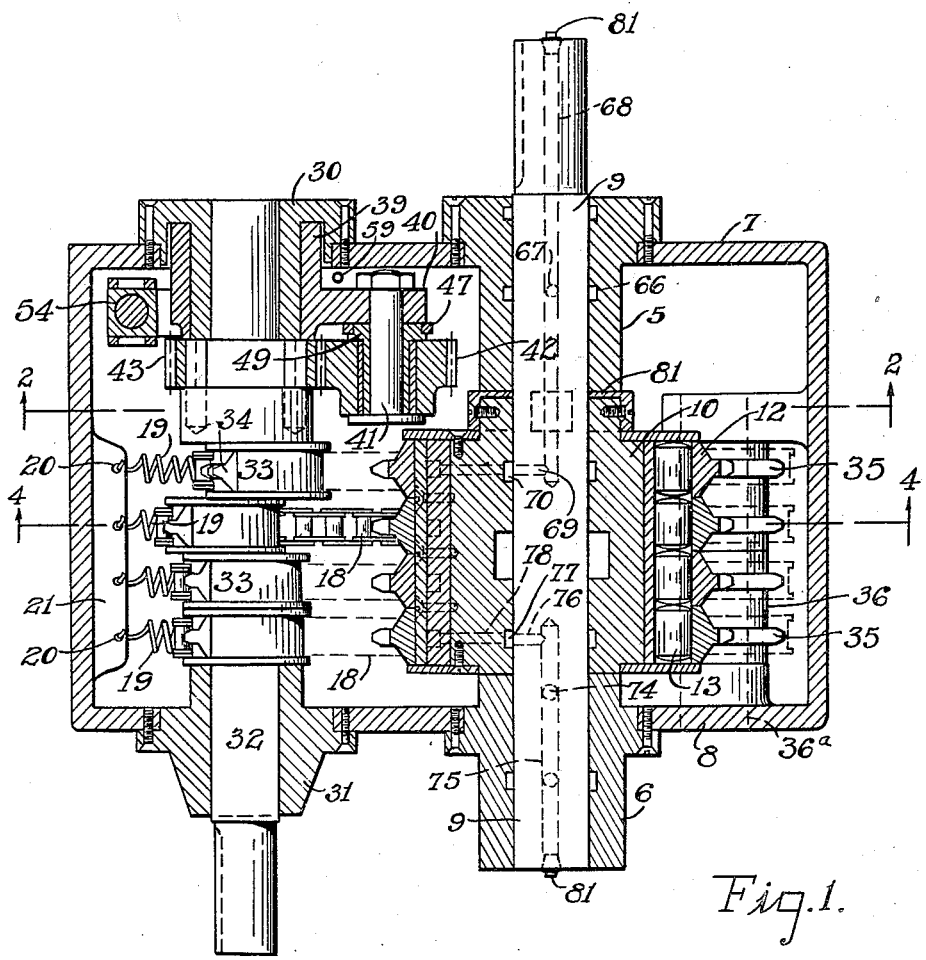
Figure 2:
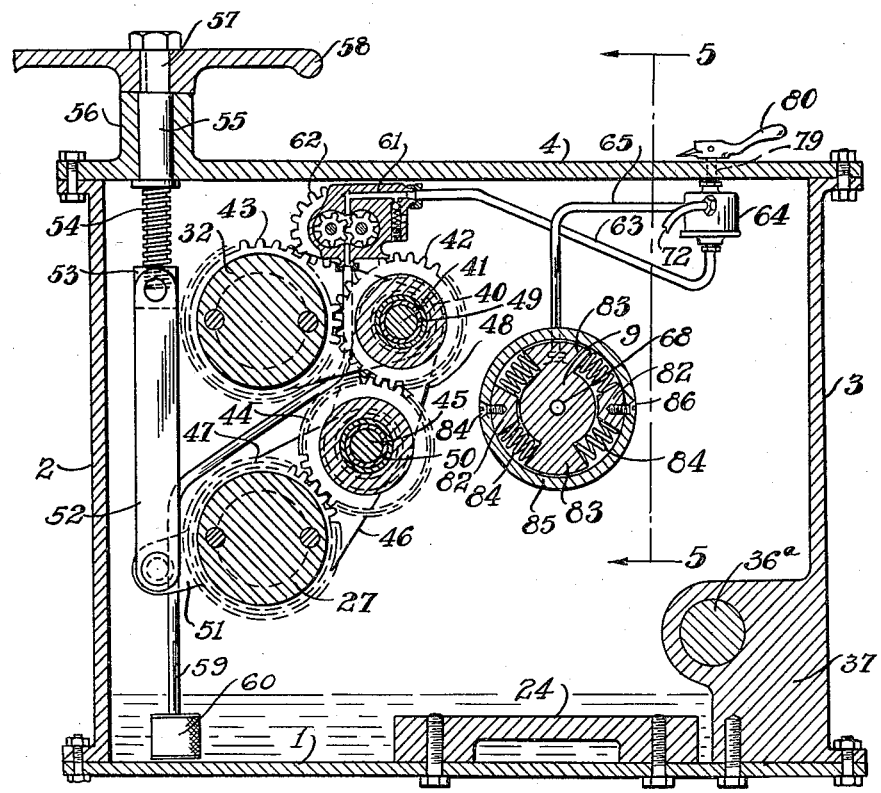
Figure 3:
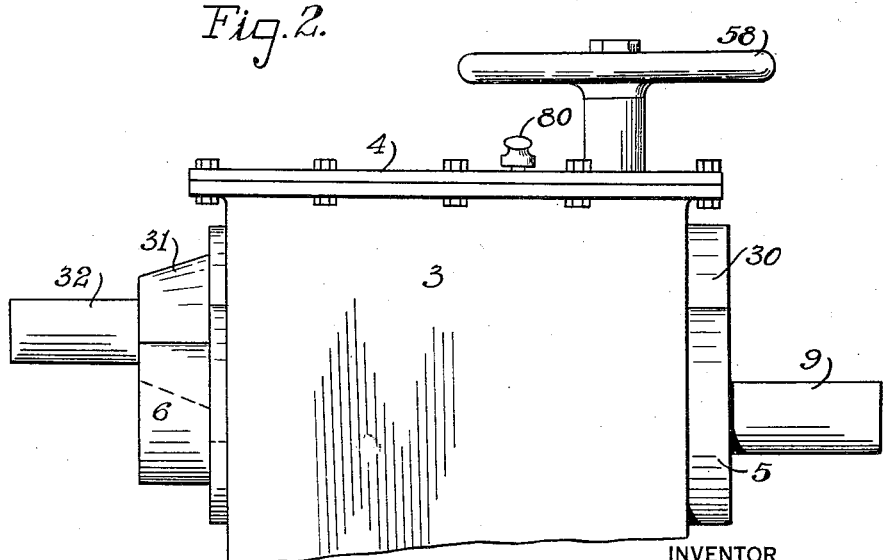

In the accompanying drawings illustrating my invention, Figure 1 is a longitudinal sectional view taken through my device, showing the variable speed shaft in section. Figure 2 is a cross sectional view taken through the device on the line 2—2 of Figure 1. Figure 3 is an end elevation of my device.

Figures 6, 7:
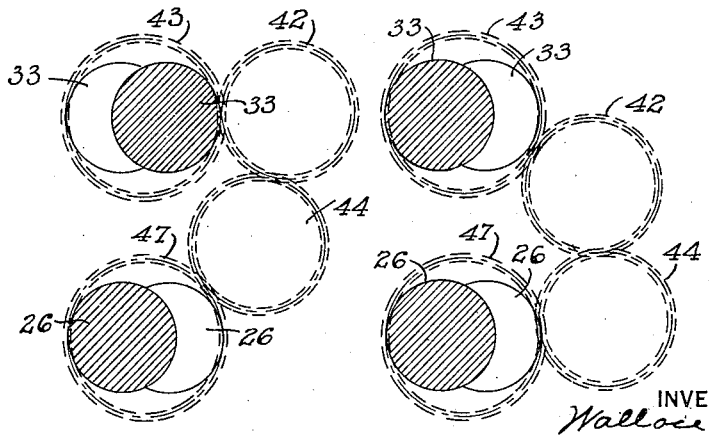
Figure 4:
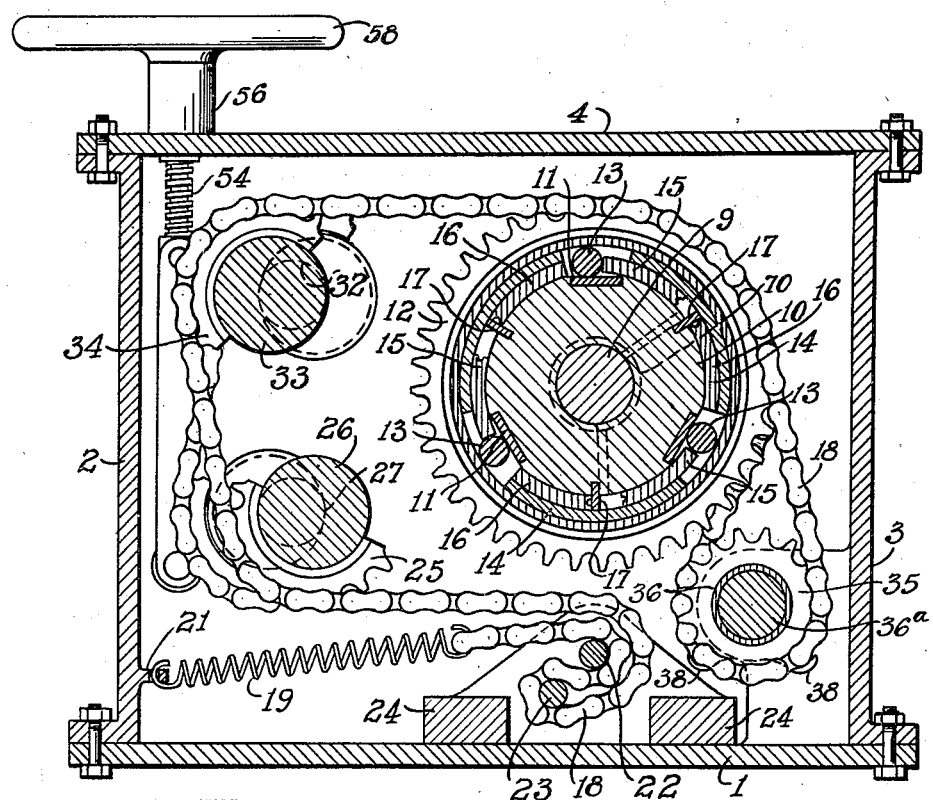
Figure 5:
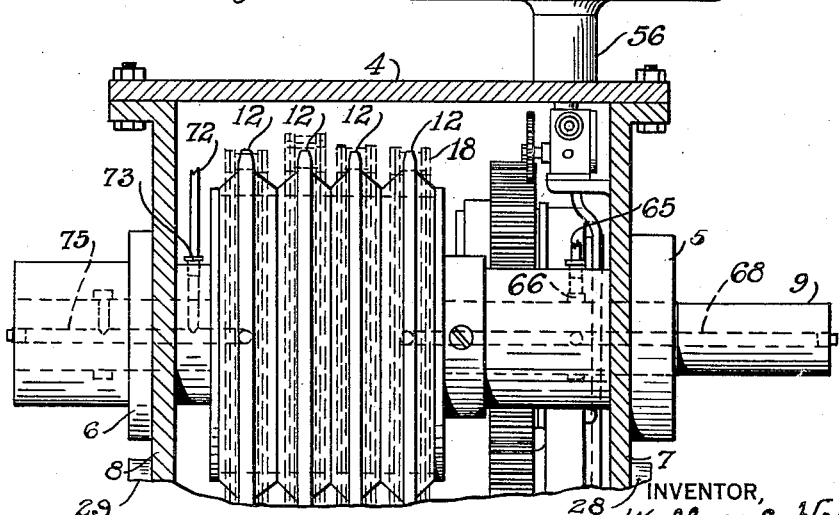

Figure 4 is a cross sectional view taken on the line 4—4 of Figure 1, showing the drive mechanism. Figure 5 is a sectional view taken on the line 5—5 of Figure 2, showing the oil pressure connections for actuating the reversing mechanism. Figure 6 is a diagrammatic view showing the eccentrics in position to effect a maximum movement of the drive chains. And Figure 7 is a diagrammatic view showing the eccentrics adjusted to cause a minimum movement of the chains.

Referring to the accompanying drawings for a detailed description of my invention, the numeral 1 designates the metal base member of a transmission casing having end walls 2 and 3. To the upper flanged parts of said end walls a top plate 4 is bolted. (See Figures 2 and 4.)

Journaled in flanged bearings 5 and 6 secured to the side walls 7 and 8 respectively of the transmission casing is a variable speed shaft 9. Fast on the latter is a hub 10 formed with a number of axial peripheral grooves, in this instance three, spaced a suitable distance apart, to receive an equal number of hard metal plates 11 which are at right angles to radial lines drawn through their central portions. Formed between each plate 11 and the inner periphery of an annular sprocket 12 surrounding the hub 10, is a space that is wedge shaped at each end, and of greater width at its middle portion than a roller 13 which it receives. The hub 10 will be driven by the sprockets in a direction dependent upon the positions of the rollers 13.

While a varied number of sprockets 12 may be employed, four are provided in the present instance. Three sector shaped members 14 are fixedly secured to the inner surface of each sprocket 12 in such a manner that their ends will define between them the fixed end walls of the roller containing spaces.

Between the plates 11 and the outer periphery of the hub 10, curved pistons 15 and 16 are free to be moved by a liquid such as oil which is introduced behind them by means to be hereinafter described.

The curved pistons 15, which are shown in their advanced positions in Figure 4, are adapted to force the rollers 13 into wedging positions that will cause the hub 10 to be rotated anti-clockwise by the sprockets 12, while the pistons 16 are designed to change the wedging positions of the rollers to effect a reverse movement of the hub by the sprockets. Between the adjacent rear grooved ends of each pair of pistons 15 and 16, a radial stop piece 17 is fixedly secured in a radial groove in the outer periphery of the hub 10; and it is into each space between a fixed radial member 17 and the rear grooved end of a respective piston that oil is forced to move the latter a sufficient distance to force a roller into a wedging position between its respective sprocket 12 and the hub 10.

For the purpose of oscillating the sprockets 12 to rotate the hub continuously clockwise or counterclockwise, dependent upon the position of the rollers 13, sprocket chains 18 are provided. The fixed ends of the sprocket chains 18 are attached to the hook ends of coil springs 19. The outer hook ends of these springs are secured in holes 20 in an elongated lug 21 on the wall 2 of the transmission case. These chains 18 are then passed around a snubber formed by two rods 22 and 23 carried by a bracket 24 bolted to the bottom plate 1 of said case.

The chains 18 then pass around sprocket teeth formed on cam followers 25 on eccentrics 26 mounted on a shaft 27. The latter is journaled in bearings secured to the walls 7 and 8 of the transmission case.

Journaled in similar bearings 30 and 31 secured to the walls 7 and 8 of said case, above the shaft 27, is a similar shaft 32 on which an eccentric 33 is mounted. On the latter eccentric there is a cam follower 34 formed with sprocket teeth around which the sprocket chains 18 then pass. The chains 18 then travel over the sprockets 12 to double sprockets 35 loosely mounted on a common hub 36 supported by a shaft 36ª in bosses 37 integral with the side wall 3, one of said bosses being shown in Figure 2. The sprocket chains 18 are arranged in two pairs, so that the chains of each pair will pass around their respective double sprocket 35 in opposite direction to permit a reverse movement of the chains. The free ends of the chains are connected to their respective sprockets 35 by hooks 38 thereon.

For the purpose of adjusting the relative positions of the eccentric cams 26 and 33 so that the chains 18 may cause a variable movement of the sprockets 12 of the roller clutch to rotate the shaft 9 at a desired speed, the following means are provided.

Referring to Figure 1, there is loosely mounted on the bearing 30 the hub 39 of a bearing arm 40 which carries a shaft 41. Loosely mounted on the latter is a gear 42 that meshes with a gear 43 keyed to the shaft 32.

The swinging gear 42 meshes with a swinging gear 44 loosely mounted on a shaft 45 carried by the inner end of a bell crank lever 46 fulcrumed in the bearing 28 for the shaft 27. Keyed to the latter is a gear 47 which meshes with the swinging gear 44. A link 48 is connected between a sleeve 49 on the shaft 41 and a sleeve 50 on the shaft 45, whereby, when the bell crank lever 46 is moved by means hereinafter to be described to change the position of the gear 44, the position of the gear 42 will also be altered.

The means for moving the bell crank lever 46 will now be described. Pivotally secured to the inner end 51 of said lever is the lower end of a vertical link 52. Pivotally secured to the upper end of the latter is a coupling block 53 formed with a tapped vertical hole to receive the lower threaded end 54 of a shaft 55 whose smooth portion is free to rotate in a hollow vertical boss 56 integral with the top wall 4 of the casing. Applied to the upper reduced end 57 of the shaft 54 is a handle 58 by which the shaft may be rotated to raise or depress the outer end 51 of the bell crank lever 46. (See Figure 2.)

It will now be seen that the positions of the eccentric cams 26 and 33 may be adjusted relative to each other by the actuation of the bell crank lever 46, because the shaft 45 carried by its inner end is connected by the link 48 to the shaft 41. Since the gears 44 and 42 are mounted on these shafts and mesh with the gears 47 and 43 respectively, any change in the positions of said shafts 45 and 41 will change the relative positions of the eccentric cams 26 and 33 without disengaging the gears.

In Figure 4 the positions of the eccentric cams 26 and 33 are substantially such as to neutralize their effect upon the chains 18, since in these positions one set of eccentric cams takes up the slack in those chains created by the other, with the result that no pull is exerted upon the sprockets 12. However, if through the adjusting device operated by the handle 58, the eccentric cams 26 and 33 are brought to the positions shown in Figure 6, both sets of cams on their outward movement will elongate the path of the chains to cause them to exert their maximum movement of the sprockets 12 of the roller clutch for the purpose of rotating the shaft 9 at its greatest speed.

Between zero and maximum a wide number of speeds for the shaft 9 may be obtained by adjusting the relative positions of the eccentric cams 26 and 33 by means of the hand-operated bell crank lever shifting device.

The shaft 32 is rotated by power means (not shown) applied to its outer end. When rotated, the shaft 32 not only turns the cams 33 that carry the toothed followers 34, but through the fixed gear 43, the swinging gears 42 and 44, and the gear 47 fast on the shaft 27, rotates the latter upon which the eccentric cams 26 carrying the toothed followers 25, are mounted.

The means for controlling the roller clutch to obtain a forward or a reverse movement of the shaft 9, will now be described. Referring to Figure 2, an oil line 59 leads from a screened inlet 60 to a conventional oil pump 61 which is operated by the engagement of the gear 62 with the gear 43. Oil under pressure is discharged by the pump 61 into a line 63 which leads to a three-way valve casing 64. To the latter there is connected a tube 65 which at its outer end communicates with an annular passage 66 within the bearing 5 for the shaft 9. Through a hole 67 in this shaft the oil then passes to an axial hole 68 which extends from one end of the shaft slightly beyond a point where it communicates with a radial hole 69. Through this hole the oil flows into an annular passage 70 in the hub 10. Then, through three radial holes 71 in the hub the oil is conducted to the pressure spaces between the fixed stop members 17 and the pistons 15 to force the latter, and through them, the rollers 13 counter-clockwise to their extreme left positions. The rollers then will rotate the hub 10 of the shaft 9 anti-clockwise when they are wedged against the plates 11 by the forward movement of the sprockets 12.

For the purpose of reversing the direction of rotation of the shaft 9 from that just described, there is provided an oil tube 72 which leads from the valve casing 64 to an annular passage 73 within the bearing 6 for the other end of the shaft 9. Through a hole 74 in this shaft the oil then passes to an axial hole 75 which extends from one end of the shaft slightly beyond a point where it communicates with a radial hole 76. Through this hole the oil flows into an annular passage 77 in the hub 10. Then through three radial holes 78 in the hub the oil is led to the pressure spaces between the fixed stop members 17 and the pistons 16 to force the latter, and through them, the rollers 13 clockwise to their opposite extreme positions. The rollers will then rotate the hub 10 of the shaft 9 clockwise when they are wedged against the plates 11 by the reverse movement of the sprockets 12.

Projecting upwardly from the valve casing 64 through a hole in the top member 4 of the case is a valve operating member 79 to which a handle 80 is attached. (See Figure 2.) By means of this handle the three way valve 64 may be easily operated to direct the oil under pressure through the tube 65 to effect a clockwise movement of the shaft 9, or through the tube 72 to cause the reverse movement of said shaft. The axial holes 68 and 75 in the shaft 9, which receive the oil from the tubes just mentioned, are closed by plugs 81. (See Figure 1.)

For the purpose of providing a resilient drive connection between the shaft 9 and the hub 10, the latter is formed at one end with driving lug extensions 82, 82. (See Figures 1 and 2.)

Formed on the shaft 9 are driving lugs 83, 83, which are fitted between the lug extensions 82, 82. Helical springs 84, inserted between the shaft lugs 83 and the hub lug extensions 82, are held in place by a ring 85 secured to said hub extensions by screws 86. The spring connection thus described provides a resilient drive for the shaft 9 by the roller clutch mechanism.

Having described my invention, I claim:

1. In a mechanism of the type described, a driving shaft, a driven shaft, a roller clutch surrounding the latter, an eccentric cam on the driving shaft, a third shaft rotated by the driving shaft, an eccentric cam on the third shaft, followers for said cams, chains connected between said cam followers and the roller clutch to communicate a reciprocating movement to the latter, and means for adjusting the relation between the eccentric cams to cause a desired movement of the chains when the driving shaft is rotated, for the purpose specified.

2. In a mechanism of the type described, a driving shaft, a driven shaft, a roller clutch surrounding the latter, an eccentric cam on the driving shaft, a third shaft rotated by the driving shaft, an eccentric cam on the third shaft, toothed followers for said cams, chains passing over the cam followers and the roller clutch, resilient means for securing the front ends of the chains, a double sprocket for receiving from opposite directions the other ends of chains of each pair, and means for adjusting the relation between the eccentric cams to cause a movement from zero to maximum of the chains when the driving shaft is rotated.

3. In a mechanism of the type described, a driving shaft, a driven shaft, a roller clutch surrounding the latter, an eccentric cam on the driving shaft, a third shaft, an eccentric cam on the latter shaft, followers for said cams, a swinging gear connection between the driving shaft and the third shaft, chains connected between said cam followers and the roller clutch to communicate a reciprocating movement to the latter, and means for adjusting the position of the swinging gear connection between the driving shaft and the third shaft to set the cams for a desired movement of the chains when the driving shaft is rotated.

4. In a mechanism of the type described, a driving shaft, a driven shaft, a roller clutch surrounding the latter, an eccentric cam on the driving shaft, a third shaft, an eccentric cam on the latter shaft, followers for said cams, a gear fixedly mounted on the driving shaft, a swinging gear in mesh with the first gear, a gear fixedly secured to the third shaft, a swinging member, a gear carried by the latter in mesh with the first swinging gear and the gear on the third shaft, chains connected between said cam followers and the roller clutch to communicate a reciprocating movement to the latter, and hand-operated means for adjusting the position of the swinging member to set the cams for a desired movement of the chains when the driving shaft is rotated.

5. In a mechanism of the type described, a driving shaft, a driven shaft, a roller clutch surrounding the latter, eccentric cams on the driving shaft, a third shaft, eccentric cams on the latter shaft, toothed followers for said cams, helical springs, a fixed member to which said springs are secured at their front ends, chains attached to the free ends of said springs and passing over the toothed cam followers, sprockets included in said roller clutch, over which the chains pass, a double sprocket for each pair of chains, to receive the chains of its respective pair from the clutch sprockets, for winding in opposite directions, a swinging gear connection between the driving shaft and the driven shaft, and means for adjusting the position of the swinging gear connection for setting the cams to elongate, or shorten, the path of travel of the chains, for the purpose specified.

In witness whereof I have hereunto set my hand this 9th day of April, 1930.

WALLACE C. HERMAN.